US010790560B2

(12) United States Patent
Hattori et al.

(10) Patent No.: US 10,790,560 B2
(45) Date of Patent: Sep. 29, 2020

(54) AIR ELECTRODE, METAL-AIR BATTERY AND AIR ELECTRODE MATERIAL (71) Applicant: NGK INSULATORS, LTD., Nagoya-Shi (JP)

(72) Inventors: Tatsuya Hattori, Nagoya (JP); Kenshin Kitoh, Nagoya (JP)

(73) Assignee: NGK Insulators, Ltd., Nagoya-Shi (JP)

(*) Notice: Subject to any disclaimer, the term of this patent is extended or adjusted under 35 U.S.C. 154(b) by 577 days.

(21) Appl. No.: 15/417,683

(22) Filed: Jan. 27, 2017

(65) Prior Publication Data
US 2017/0141445 A1 May 18, 2017

Related U.S. Application Data (63) Continuation of application No. PCT/JP2016/069032, filed on Jun. 27, 2016.

(30) Foreign Application Priority Data

Jun. 26, 2015 (JP) ................. 2015-128648

(51) Int. Cl.
*H01M 12/08* (2006.01)
*H01M 4/96* (2006.01)
*H01M 12/06* (2006.01)
*H01M 4/86* (2006.01)

(52) U.S. Cl.
CPC ............ *H01M 12/08* (2013.01); *H01M 4/86* (2013.01); *H01M 4/96* (2013.01); *H01M 12/06* (2013.01); *Y02E 60/128* (2013.01)

(58) Field of Classification Search
None
See application file for complete search history.

(56) References Cited

U.S. PATENT DOCUMENTS

| | | | |
|---|---|---|---|
| 2013/0143132 A1* | 6/2013 | Mizuno | H01M 4/8615 429/405 |
| 2013/0273442 A1 | 10/2013 | Ogumi et al. | |
| 2014/0333264 A1* | 11/2014 | Dai | H01M 4/9083 320/128 |
| 2015/0364789 A1 | 12/2015 | Ogawa et al. | |

FOREIGN PATENT DOCUMENTS

| | | |
|---|---|---|
| CN | 103201884 A | 7/2013 |
| JP | 2012-043567 A1 | 3/2012 |
| JP | 2012-099266 A1 | 5/2012 |
| JP | 2013-211201 A1 | 10/2013 |
| JP | 2014-011000 A1 | 1/2014 |
| JP | 2015-005493 A1 | 1/2015 |

(Continued)

OTHER PUBLICATIONS

Extended European Search Report, European Application No. 16814537.3, dated Nov. 10, 2017 (9 pages).

(Continued)

*Primary Examiner* — Zhongqing Wei
(74) *Attorney, Agent, or Firm* — Burr & Brown, PLLC (57) ABSTRACT An air electrode has a plurality of carbon nanotubes and a plurality of layered double hydroxide particles. The plurality of layered double hydroxide particles is supported on the plurality of carbon nanotubes.

13 Claims, 6 Drawing Sheets (56) References Cited

FOREIGN PATENT DOCUMENTS

KR        101309577 B1 * 9/2013

OTHER PUBLICATIONS

International Search Report and Written Opinion (Application No. PCT/JP2016/069032) dated Aug. 30, 2016.
English translation of the International Preliminary Report on Patentability (Chapter I) (Application No. PCT/JP2016/069032) dated Jan. 4, 2018.
European Office Action (Application No. 16814537.3) dated Jul. 18, 2018.
Chinese Office Action, Chinese Application No. 201680002119.X, dated Mar. 26, 2019 (7 pages).

* cited by examiner

AIR ELECTRODE, METAL-AIR BATTERY AND AIR ELECTRODE MATERIAL

TECHNICAL FIELD

The present invention relates to an air electrode, a metal-air battery, an air electrode material, and a method of manufacturing an air electrode material.

BACKGROUND ART

An air electrode for a metal-air battery typically comprises an electron conductive material as a principal component, and includes a layered double hydroxide and an adhesive as a secondary component (for example, reference is made to Patent Japanese Patent Application Laid-Open No. 2012-43567).

A carbon material or the like is used as the electron conductive material. The adhesive includes use of various types of organic binders such as polyvinylidene fluoride, polytetrafluoroethylene, and a styrene/butadiene rubber, or the like.

SUMMARY OF INVENTION

Technical Problem

There is a need for further enhancement of the air electrode characteristics (hydroxide ion conductivity, electron conductivity and catalyst reactivity). The present inventors have gained the new insight that further enhancement to the characteristics of the air electrode is possible by use of carbon nanotubes as a binder.

The present invention is proposed in light of the above insight, and has the object of providing an air electrode, a metal-air battery and an air electrode material that exhibit enhanced characteristics.

Solution to Problem

The air electrode of the present invention is an air electrode that is used in a metal-air battery, and includes a plurality of carbon nanotubes (CNT) and a plurality of layered double hydroxide particles (LDH). The plurality of layered double hydroxide particles are supported on the plurality of carbon nanotubes.

Advantageous Effects of Invention

The present invention provides an air electrode, a metal-air battery and an air electrode material that exhibit enhanced characteristics.

DETAILED DESCRIPTION OF THE INVENTION

A metal-air battery according to the embodiments will be described below making reference to the figures. A metal-air battery is a concept that includes configurations such as a zinc-air secondary battery or a lithium-air secondary battery or the like. The present embodiment describes a zinc-air secondary battery as an example of a metal-air battery.

Those aspects of configuration in the following description of the figures that are the same or similar are denoted by the same or similar reference numerals. However, the figures are merely illustrative, and the actual ratios or the like of the respective dimensions may differ.

Configuration of Zinc-Air Secondary Battery 10

Figure 1:
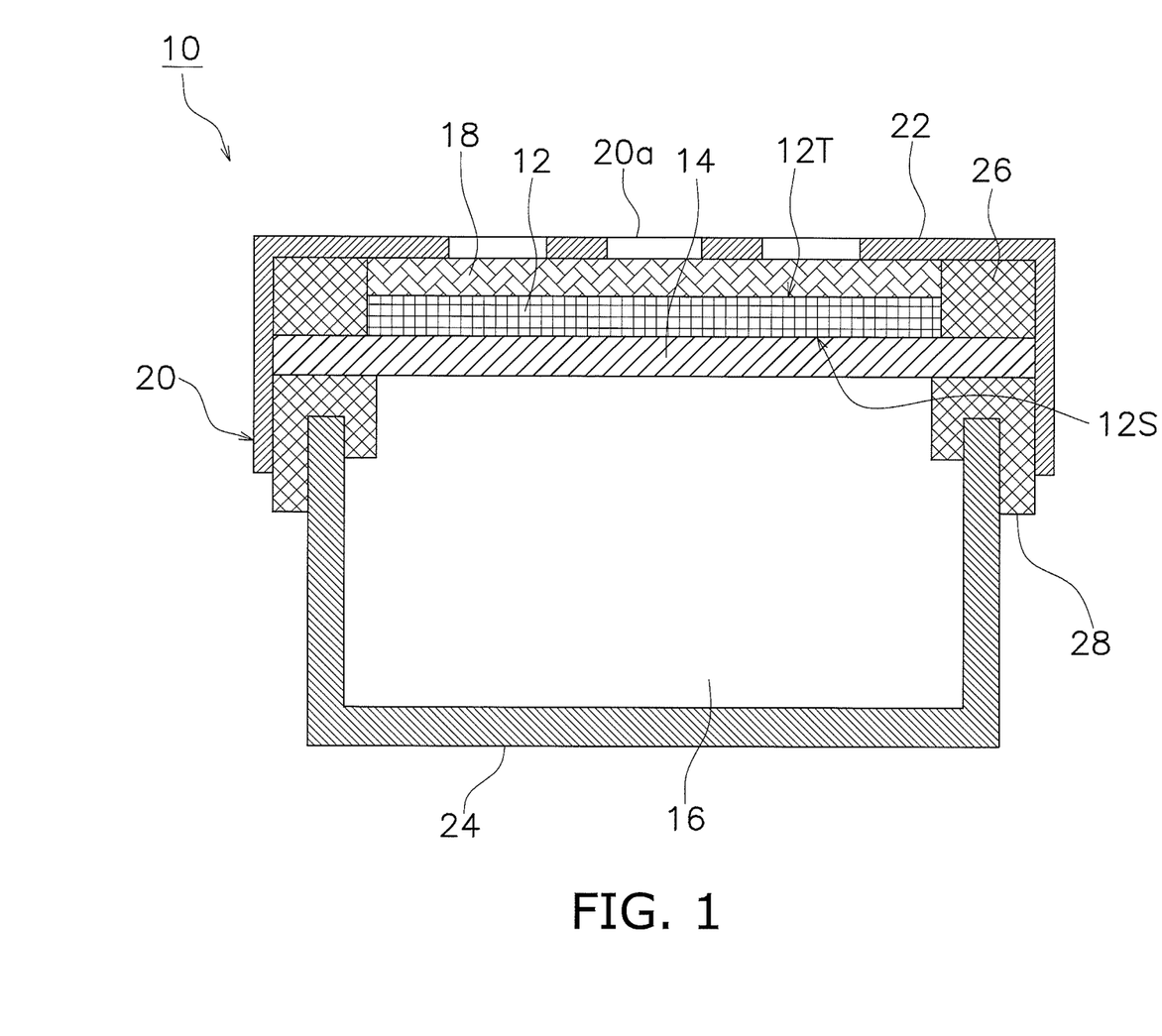
FIG. 1 is a cross sectional view that schematically illustrates a configuration of a zinc-air secondary battery 10.

FIG. 1 is a cross sectional view that schematically illustrates a configuration of a zinc-air secondary battery 10. The zinc-air secondary battery 10 includes an air electrode 12, an hydroxide ion conductive separator 14, a negative electrode 16 immersed in an electrolyte solution, a positive electrode current collecting body 18, and a housing 20.

1. Air Electrode 12

The air electrode 12 functions as a positive electrode that causes reactions that produce and/or reduce $O_2$. The air electrode 12 is disposed on the hydroxide ion conductive separator 14. The air electrode 12 includes a first principal surface 12S and a second principal surface 12T. The air electrode 12 comes into contact with the hydroxide ion conductive separator 14 on the first principal surface 12S. The air electrode 12 comes into contact with the positive electrode current collecting body 18 on the second principal surface 12T.

Although there is no particular limitation on the thickness of the air electrode 12, it may be 1 to 100 μm, preferably may be 1 to 75 μm, more preferably may be 1 to 50 μm, and still more preferably may be 1 to 30 μm. In this manner, the surface area of the three phase interface of the gaseous phase, the electron conductive phase and the hydroxide ion conductive phase can be ensured to thereby maintain the catalytic reactivity of the air electrode 12.

The air electrode 12 includes carbon nanotubes (abbreviated below to "CNT") and layered double hydroxide particles (abbreviated below to "LDH").

CNT is configured from a fibrous carbon material forming a hexagonal lattice structure of graphene into a cylindrical shape. CNT may be configured as a single-walled carbon nanotube or as a multi-walled carbon nanotube. Both ends of the CNT may be closed or open.

CNT functions as an inorganic binder. CNT maintains the shape of the air electrode 12 by binding the LDH. CNT functions as an oxygen reducing/producing catalyst. The catalytic reactivity of the air electrode 12 can be enhanced by including CNT in the air electrode 12. CNT functions as an electron conductive body. The electron conductivity of the air electrode 12 can be enhanced by including CNT in the air electrode 12.

CNT preferably is configured inside the air electrode 12 in an untangled state rather than in a bundled configuration. In this manner, LDH can be bound efficiently. However, a portion of CNT may be present in a bundled configuration within the air electrode 12.

LDH exhibits hydroxide ion conductivity. LDH is expressed by the general formula $M^{2+}_{1-x}M^{3+}_{x}(OH)_2 A^{n-}_{x/n} \cdot mH_2O$ (wherein $M^{2+}$ is one or more types of bivalent positive ion, $M^{3+}$ is one or more types of trivalent positive ion, $A^{n-}$ is an n valent negative ion, n is an integer of at least 1, x is 0.1 to 0.4, and m is greater than or equal to 0). $M^{2+}$ may include $Ni^{2+}$, $Mg^{2+}$, $Ca^{2+}$, $Mn^{2+}$, $Fe^{2+}$, $Co^{2+}$, $Cu^{2+}$, $Zn^{2+}$. $M^{3+}$ may include $Fe^{3+}$, $Al^{3+}$, $Co^{3+}$, $Cr^{3+}$, $In^{3+}$. $A^{n-}$ may include $NO_3^-$, $CO_3^{2-}$, $SO_4^{2-}$, $OH^-$, $Cl^-$, $I^-$, $Br^-$, $F^-$. In particular, an Mg—Al configuration of LDH is preferred in which $M^{2+}$ is $Mg^{2+}$, and $M^{3+}$ may inc include $Al^{3+}$.

The CNT content amount in the air electrode 12 is greater than or equal to 0.1 volume % to less than or equal to 40 volume %. In this manner, CNT that functions as an oxygen reducing/producing catalyst and an electron conductive body can be caused to function as an inorganic binder. Therefore the air electrode 12 does not require the inclusion of an organic binder to contribute in some manner to the characteristics (electron conductivity or catalytic reactivity), and therefore the characteristics of the air electrode 12 can be conspicuously enhanced when compared to a configuration in which LDH is bound by use of an organic binder. The content amount of CNT in the air electrode 12 is preferably greater than or equal to 0.1 volume % to less than or equal to 30 volume %, and more preferably greater than or equal to 0.1 volume % to less than or equal to 20 volume %.

The content amount of LDH in the air electrode 12 may be configured as greater than or equal to 60 volume % to less than or equal to 99.9 volume %. The content amount of LDH in the air electrode 12 is preferably greater than or equal to 60 volume % to less than or equal to 90 volume %, and still more preferably the content amount of LDH in the air electrode 12 may be configured as greater than or equal to 60 volume % to less than or equal to 70 volume %.

The volume ratio of CNT to LDH in the air electrode 12 (CNT volume÷LDH volume) is preferably at least 0.001. In this manner, LDH can be generally enclosed in CNT and it is possible to further enhance the electron conductivity of the air electrode 12. The volume ratio of CNT to LDH in the air electrode 12 is preferably less than or equal to 1. In this manner, it is possible to further enhance the hydroxide ion conductivity of the air electrode 12.

The air electrode 12 may include a perovskite oxide that is expressed by the general formula $ABO_{3-\delta}$ (wherein $\delta \leq 0.4$). This type of perovskite oxide preferably exhibits electron conductivity, but is not required to exhibit electron conductivity. The perovskite oxide preferably functions as an oxygen reducing/producing catalyst.

The perovskite oxide is preferably a perovskite oxide that is expressed by the general formula $ABO_{3-\delta}$ (wherein $\delta \leq 0.4$), that includes at least La at the A site and that includes at least Ni, Fe and Cu at the B site. This type of perovskite oxide is expressed by the composition formula $LaNi_{1-x-y}Cu_xFe_yO_{3-\delta}$ (x>, y>0, x+y<1, $0 \leq \delta \leq 0.4$). In the following description, a perovskite oxide that is expressed by the composition formula $LaNi_{1-x-y}Cu_x Fe_yO_{3-\beta}$ will be abbreviated as LNFCu.

In the composition formula for LNFCu, it is preferred that $x \leq 0.5$, further preferred that $0.01 \leq x \leq 0.5$, and still more preferred that $0.05 \leq x \leq 0.3$. It is possible to enhance the electron conductivity, the coefficient of thermal expansion and the catalytic reactivity of the air electrode 12 by adjusting x and y to the above range.

LNFCu is preferably configured by a single perovskite phase. In this manner, it is possible to further enhance the electron conductivity and the catalytic reactivity of the air electrode 12

The perovskite oxide may contain LNFCu as a principal component. In the present embodiment, the term such that composition P "contains as a principal component" substance Q means that substance Q occupies greater than or equal to 70 wt %, and preferably occupies greater than or equal to 90 wt % of the total of composition P.

The content amount of the perovskite oxide in the air electrode 12 may be configured as greater than or equal to 0.1 volume % to less than or equal to 50 volume %. The content amount of the perovskite oxide in the air electrode 12 is preferably greater than or equal to 0.1 volume % to less than or equal to 40 volume %. The volume ratio of CNT relative to the perovskite oxide in the air electrode 12 (CNT volume÷perovskite oxide volume) may be configured as greater than or equal to 0.002 to less than or equal to 400, and is preferably greater than or equal to 0.02 to less than or equal to 40.

The air electrode 12 may contain a minute quantity of an organic binder. The content amount of the organic binder in the air electrode is preferably less than or equal to 10 volume %. Although a thermoplastic resin or thermos-curing resin may be used as the organic binder, there is no particular limitation in this regard.

Preferred examples of the organic hinder include
The binder is not particularly well limited and a thermoplastic resin or a thermosetting resin, preferred examples include carboxymethyl cellulose (CMC), polyethylene, polypropylene, polytetrafluoroethylene (PTFE), polyvinylidene fluoride (PVDF), styrene-butadiene rubber, tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, an ethylene-tetrafluoroethylene copolymer (ETFE resin), polychlorotrifluoroethylene (PCTFE), vinylidene fluoride-pentafluoro propylene copolymer, a propylene-tetrafluoroethylene copolymer polymer, ethylene-chlorotrifluoroethylene copolymer (ECTFE), vinylidene fluoride-hexafluoropropylene-tetrafluoroethylene copolymer, vinylidene fluoride-perfluoromethylvinylether-tetrafluoroethylene copolymer, ethylene-acrylic acid copolymer, and any arbitrary mixture of the above.

2. Hydroxide Ion Conductive Separator 14

The hydroxide ion conductive separator 14 is disposed between the air electrode 12 and the negative electrode 16. The hydroxide ion conductive separator 14 makes contact with the first principal surface 12S of the air electrode 12. The hydroxide ion conductive separator 14 is configured from a material that exhibits selective permeability to the hydroxide ions that are produced and consumed in the air electrode 12.

The hydroxide ion conductive separator 14 preferably does not allow passage of alkali metal ions in the electrolyte solution or undesirable substances (such as carbon dioxide or the like) other than oxygen that is contained in the air. Such materials include compact ceramics that are inorganic solid electrolytes that exhibit hydroxide ion conductivity.

An inorganic solid electrolyte that exhibits hydroxide ion conductivity is preferably LDH that has been compacted by use of a solidifying method (for example, a hydrothermal solidifying method) that that is expressed by the general formula $M^{2+}_{1-x}M^{3+}_x(OH)_2A^{n-}_{x/n} \cdot mH_2O$. An inorganic solid electrolyte that exhibits hydroxide ion conductivity may include use of a configuration that has at least one type of basic composition selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot x H_2O$.

The above inorganic solid electrolytes have been disclosed in PCT Laid Open Application 2011/108526 as a solid electrolyte that exhibits hydroxide ion conductivity for used in relation to a fuel cell. It is possible to suppress deterioration of the electrolyte solution resulting from production of carbon ions as a result of use of a solid electrolyte that exhibits hydroxide ion conductivity as the hydroxide ion conductive separator 14, and to suppress production of short circuiting between the positive and negative electrodes through the hydroxide ion conductive separator 14 as a result of zinc dendrites produced during charging.

The hydroxide ion conductive separator 14 may be configured as a composite body including a particle group containing the inorganic solid electrolyte that exhibits hydroxide ion conductivity and a component that assists in the curing or compaction of the particle group.

The hydroxide ion conductive separator 14 may be also configured as a composite body including an open-pore porous body that is used as a substrate and an inorganic solid electrolyte that is deposited or grown in the pores to thereby embed the pores of the porous body. The porous body may be configured as an insulating material such as a porous sheet or the like that is configured from a resin foam or a fibrous material, or a ceramic such as alumina, zirconia, or the like.

The relative density of the hydroxide ion conductive separator 14 as calculated by use of an Archimedes method is preferably greater than or equal to 88%, more preferably greater than or equal to 90%, and still more preferably greater than or equal to 94%.

There is no particular limitation on the shape of the hydroxide ion conductive separator 14, and a dense plate shape or film configuration is possible. When formed as a plate, the thickness of the hydroxide ion conductive separator 14 may be configured as 0.001 to 0.05 mm, preferably 0.001 to 0.01 mm, and more preferably 0.001 to 0.005 mm.

A higher hydroxide ion conductivity in the hydroxide ion conductive separator 14 is preferred, and typically exhibits a conductivity of $1\times10^{-4} \sim 1\times10^{-1}$ S/m ($1\times10^{-3} \sim 1$ mS/cm), and more typically $1\times10^{-4} \sim 1\times10$ S/M ($1\times10^{-3} \sim 1\times10^{-1}$ mS/cm).

3. Negative Electrode

The negative electrode 16 is disposed on the opposite side of the air electrode 12 to thereby sandwich the hydroxide ion conductive separator 14. The negative electrode 16 is immersed in an electrolyte solution.

The negative electrode 16 includes zinc or a zinc alloy that functions as a negative electrode active material. There is no particular limitation in relation to the shape of the negative electrode 16, and a configuration as a particle, plate or gel is possible with a particle or gel configuration being preferably in light of reaction rate. The particle diameter of a particle-shaped negative electrode 16 is preferably 30 to 350 μm. A gel-shaped negative electrode 16 is preferably shaped into a gel configuration by mixing and agitating a non-mercury zinc alloy powder having a particle diameter of 100 to 300 μm, an alkali electrolyte solution and a thickener (gelling agent).

The zinc alloy includes mercury alloys or non-mercury alloys with magnesium, aluminum, lithium, bismuth, indium, lead, or the like. The zinc alloy is suitably a non-mercury zinc alloy without addition of mercury or lead. It is preferred to include aluminum, bismuth, indium or a combination thereof. The zinc alloy more preferably contains 50 to 1000 ppm bismuth, 100 to 1000 ppm indium, and 10 to 100 ppm aluminum and/or calcium, and still more preferably 100 to 500 ppm bismuth, 300 to 700 ppm indium, and 20 to 50 ppm aluminum and/or calcium.

The negative electrode 16 may be supported on the negative electrode current collecting body. The negative electrode current collecting body includes a configuration in stainless steel, a metal plate of copper and nickel or the like, a metal mesh, carbon paper, an oxide conductor, or the like.

The electrolyte solution includes use of a known electrolyte solution that is generally used in zinc-air batteries. The electrolyte solution includes use of an alkali metal hydroxide aqueous solution such as a potassium hydroxide aqueous solution, a sodium hydroxide aqueous solution, or the like, an aqueous solution including zinc chloride or zinc perchlorate, a non-aqueous solvent including zinc perchlorate, a non-aqueous solvent including a zinc bis(trifluoromethylsulfonyl) imide. The electrolyte solution is preferably a potassium hydroxide aqueous solution that is one type of an alkali metal hydroxide aqueous solution, and more preferably includes 3 to 50 wt % of potassium hydroxide (for example, 30 to 45 wt %).

4. Positive Electrode Current Collecting Body 18

The positive electrode current collecting body 18 is disposed on the opposite side of the hydroxide ion conductive separator 14 to thereby sandwich the air electrode 12. The positive electrode current collecting body 18 makes contact with the second principal surface 12T of the air electrode 12.

The positive electrode current collecting body 18 preferably is configured with air permeability to enable supply of air to the air electrode 12. The positive electrode current collecting body 18 includes a configuration in stainless steel, a metal plate of copper and nickel or the like, a metal mesh, carbon paper, an oxide conductor, or the like.

5. Battery Housing 20

The battery housing 20 contains the air electrode 12, the hydroxide ion conductive separator 14, the negative electrode 16 and the positive electrode current collecting body 18. The battery housing 20 includes an air electrode housing 22, an negative electrode housing 24, an air electrode gasket 26 and an negative electrode gasket 28.

The air electrode housing 22 contains the air electrode 12, the hydroxide ion conductive separator 14, and the positive electrode current collecting body 18. Pores 20a are formed in the air electrode housing 22 to enable passage of external air. The negative electrode housing 24 contains the negative electrode 16.

The air electrode gasket 26 is disposed along an inner peripheral edge of the air electrode housing 22. Although there is no limitation in relation to the material, shape and structure of the air electrode gasket 26 and the negative electrode gasket 28, a configuration using a material that exhibits insulating characteristics such as nylon or the like is preferred. Air tight characteristics of the inner portion of the air electrode housing 22 and the negative electrode housing 24 are ensured by sandwiching the hydroxide ion conductive separator 14 with the air electrode gasket 26 and the negative electrode gasket 28.

Microstructure of the Air Electrode 12

Figure 2:
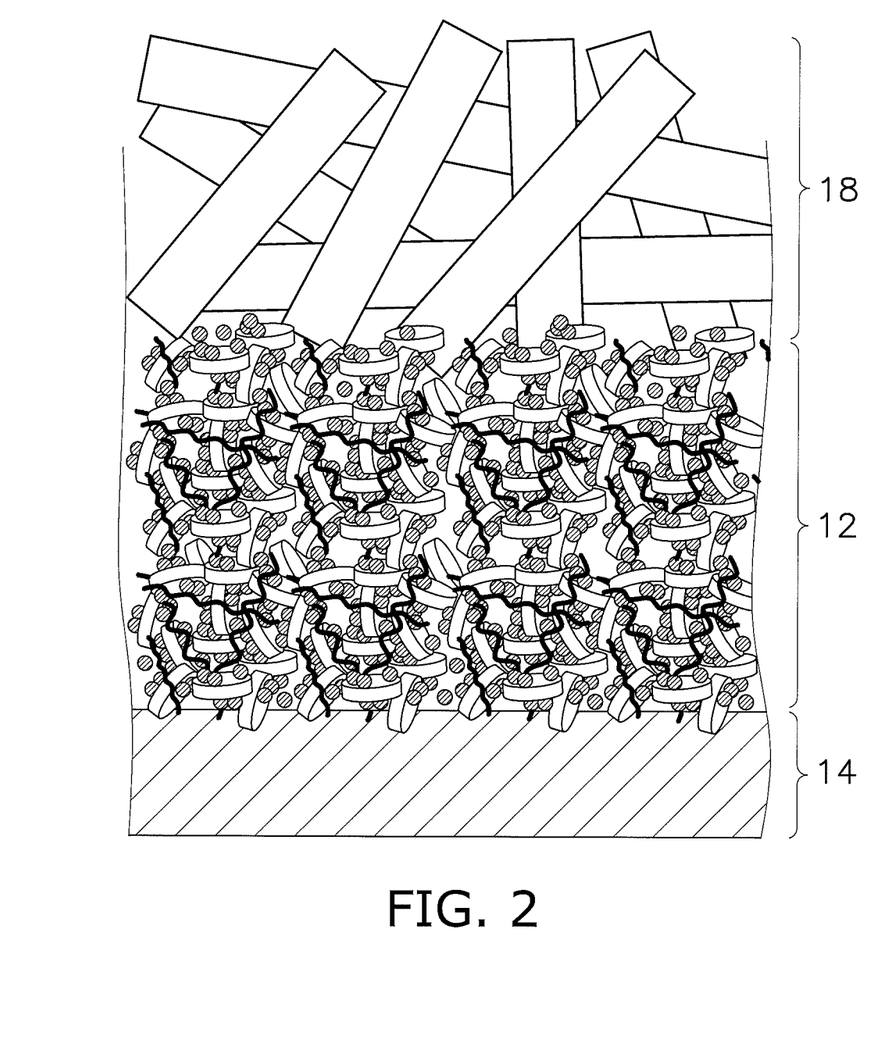
FIG. 2 is an enlarged cross sectional view of an air electrode.
Figure 3:
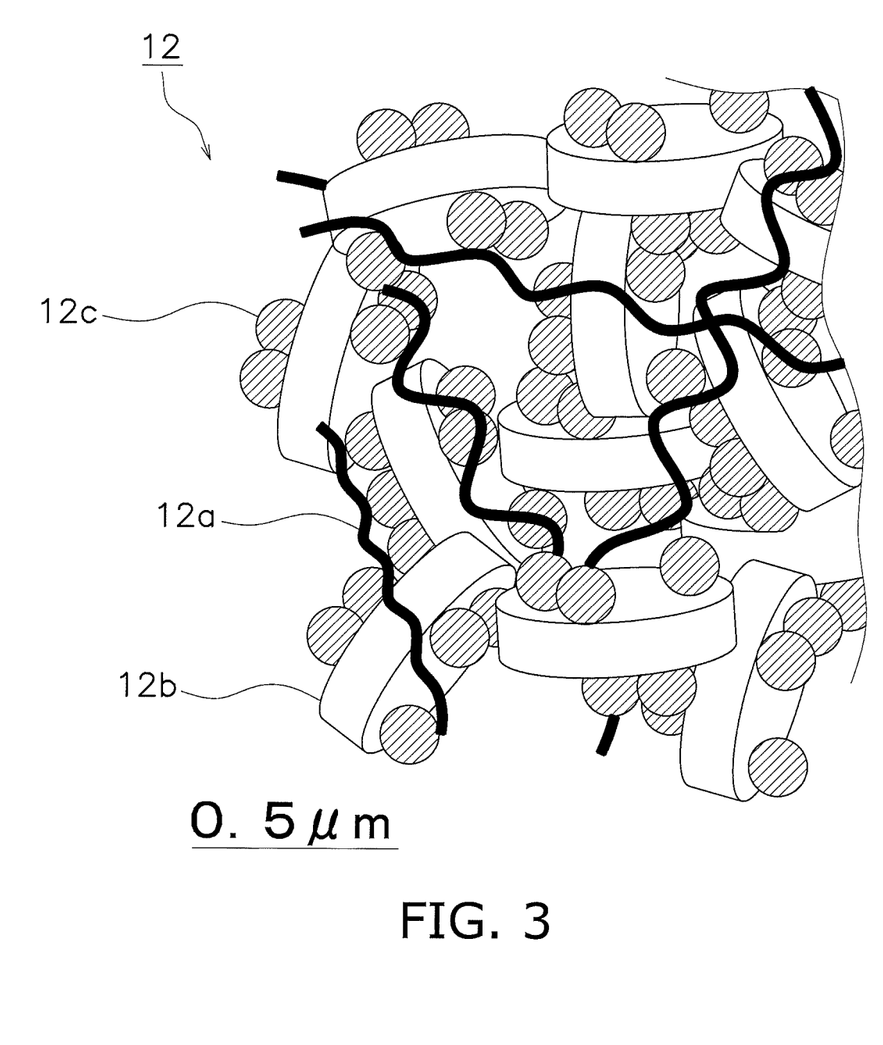
FIG. 3 is a partially enlarged view of FIG. 2.

Next, the detailed microstructure of the air electrode 12 will be explained. FIG. 2 is an enlarged cross sectional view of an air electrode. FIG. 3 is a partially enlarged view of FIG. 2.

As illustrated in FIG. 2 and FIG. 3, the air electrode 12 is disposed between the hydroxide ion conductive separator 14 and the positive electrode current collecting body 18. The air electrode 12 includes a plurality of CNT 12a and a plurality of LDH particles 12b.

The CNT 12a has a string shape. Although the CNT 12a in the present embodiment has a structure that is wound into a spiral, it may have a linear shape, a curved shape, or a bow shape. Although the average length of the CNT 12a is greater than or equal to 0.1 μm, there is no limitation in this regard. Although the average diameter of the CNT 12a is greater than or equal to 1.0 nm, there is no limitation in this regard.

The plurality of CNT 12a generally encloses the plurality of LDH 12b. The plurality of CNT 12a preferably is entangled into the plurality of LDH 12b. In this manner, the shape of the air electrode 12 can be strongly maintained. It is preferred that at least a portion of the CNT 12a in the plurality of CNT 12a makes mutual contact. In this manner, a long distance electron conducting path can be formed. It is preferred that at least a portion of the CNT 12a in the plurality of CNT 12a is connected in a vertical direction (referred to below as "the thickness direction") to the first principal surface 12S or the second principal surface 12T. In this manner, the electron conductivity of the air electrode 12 in the thickness direction can be enhanced.

The particle shape of the LDH particles 12b is tabular. Although the LDH particles 12b in the present embodiment are formed as an elliptic plate, they may be formed as a disc or square plate. The average particle diameter of the LDH particles 12b is preferably less than or equal to 10 µm. The average particle diameter of the LDH particles 12b may be greater than or equal to 0.01 nm and less than or equal to 5 µm. The average particle diameter of the LDH particles 12b is preferably less than or equal to 1 µm. The average particle diameter of the LDH particles 12b is the diameter of a tabular particle when observing the particle shape using an SEM (scanning electron microscope).

The LDH particles 12b are supported by the string-shaped CNT 12a. The LDH particles 12b may be supported indirectly by the CNT 12a through another LDH particle 12b, but are preferably supported by making direct contact with the CNT 12a. The LDH particles 12b may make direct contact with a plurality of CNT 12a. It is possible to promote the catalytic activity of the air electrode 12 by causing a reaction between the hydroxide ions that pass through the LDH particles 12b and the electrons that pass through the CNT 12a. There is no particular limitation in relation to the ratio of particles of LDH particles 12b that make direct contact with the CNT 12a of the plurality of LDH particles 12b, but a value of greater than or equal to 90% is preferred.

At least a portion of the LDH particles 12b of the plurality of LDH particles 12b is preferably in mutual contact. In this manner, a conducting path for hydroxide ions can be formed. In particular, it is preferred that the plurality of LDH particles 12b is connected in the thickness direction.

As illustrated in FIG. 2 and FIG. 3, the air electrode 12 preferably contains a plurality of perovskite oxide particles 12c. The perovskite oxide particles 12c are preferably LNFCu particles.

The particle shape of the perovskite oxide particles 12c in the present embodiment is ball shaped, but may also be spherical, complex or irregular. The average particle diameter of the perovskite oxide particles 12c may be greater than or equal to 0.01 µm and less than or equal to 10 µm. The average particle diameter of the perovskite oxide particles 12c is preferably smaller than the average particle diameter of the LDH particles 12b. More specifically, the average particle diameter of the perovskite oxide particles 12c is preferably less than or equal to 0.1 µm. The average particle diameter of the perovskite oxide particles 12c is the particle diameter when observing the particle shape using an SEM.

The perovskite oxide particles 12c are preferably supported on the LDH particles 12b. The perovskite oxide particles 12c may be disposed on the two principal surfaces of the tabular LDH particles 12b, or may be disposed on a side surface of the tabular LDH particles 12b. The perovskite oxide particles 12c preferably do not completely cover the entire surface of the LDH particles 12b. In this manner, a connection between LDH particles 12b and a connection between the CNT 12a and the LDH particles 12b can be created since a portion of the surface of the LDH particles 12b can be exposed.

At least a portion of the perovskite oxide particles 12c of the plurality of perovskite oxide particles 12c is preferably in mutual contact. In this manner, a short distance electron conducting path can be formed. At least a portion of the perovskite oxide particles 12c of the plurality of perovskite oxide particles 12c preferably makes direct contact with the CNT 12a. In this manner, the long distance electron conducting path of the CNT 12a can be connected with the short distance electron conducting path of the plurality of perovskite oxide particles 12c.

Method of Manufacture Zinc-Air Secondary Battery 10

1. Preparation of Air Electrode 12

Firstly, a CNT dispersion is prepared. The CNT dispersion can be prepared by dispersing CNT in a solvent (for example, water or the like). The CNT concentration in the CNT dispersion can be configured as 0.1 wt % to 2.0 wt %, but there is no particular limitation in this regard. CNT is difficult to disperse in a liquid that exhibits a property of tending to coagulate. Consequently, a commercially available CNT dispersion (for example, a (Tradename) SWAT dispersion manufactured by Meijo Carbon (Ltd.)) may be used.

Next, the CNT dispersion is heated to vaporize the solvent and thereby concentrate the CNT dispersion. In this manner, the viscosity of the CNT dispersion can be configured to greater than or equal to 0.1 Pa·s and less than or equal to 200 Pa·s and thereby more effectively realize the function of the CNT dispersion as a binder.

Next, an LDH powder expressed by the general formula above of $M^{2+}_{1-x}M^{3+}_x(OH)_2 A^{n-}_{x/n} \cdot mH_2O$ is prepared.

Then, a perovskite oxide powder is prepared in the event that a perovskite oxide is to be introduced into the air electrode 12. In the following description, a perovskite oxide powder will be described that uses an LNFCu powder. Firstly, a lanthanum hydroxide powder, a nickel oxide powder, a copper oxide powder and an iron oxide powder are dried (110 degrees C., 12 hours). Then, the respective powders that have been dried so that La, Ni, Cu and Fe coincide with desired molar ratios are weighed. Then, after wet blending of the weighed powders in an aqueous medium and drying, a blended powder is prepared by passing through a sieve. Next, a calcined powder is prepared by placing the blended powder in a covered alumina crucible and calcining in an oxygen atmosphere (900 to 1200 degrees C., 12 hours). Next, after pulverizing the calcined powder and applying uniaxial pressing, a green body is formed by use of a CIP (cold isostatic press). Then, a sintered body is prepared by disposing the green body in an alumina sheath and firing in an oxygen atmosphere (900 to 1200 degrees C., 12 hours). Then the sintered body is subjected to wet grinding using a ball mill to prepare an LNFCu powder:

Next, the concentrated CNT dispersion and the LDH powder are respectively weighed. At that time, the perovskite oxide powder is also weighed in the event of preparing a perovskite oxide powder.

Then, after placing the weighed CNT dispersion and the LDH powder into an agate mortar, the agate mortar is heated using a hot stirrer (60 to 90 degrees C.) to thereby blend the CNT dispersion and the LDH powder and prepare a blended paste (example of air electrode material).

At that time, the solvent is vaporized from the blended paste until reaching a viscosity that enables printing in the following step. The volume ratio (CNT volume÷LDH volume) of CNT in the blended paste to LDH is greater than or equal to 0.001 to less than or equal to 1. In this manner, the preparation of a blended paste using a CNT dispersion enables a conspicuous improvement in the uniformity of the blending characteristics of CNT in the blended paste in comparison to a configuration in which CNT is used in a powdered or sheet shape. As a result, the air electrode 12 can be given an overall uniform configuration. When weighing the perovskite oxide powder, the perovskite oxide powder can be blended together with the CNT dispersion and the LDH powder.

Then, after using a printing method to print the blended paste onto the positive electrode current collecting body 18 (for example, carbon paper or the like), drying is performed (60 to 120 degrees C., 1 to 12 hours) in an atmosphere of air. A layered body of the air electrode 12 and the positive electrode current collecting body 18 is completed in accordance with the above description.

2. Preparation of Hydroxide Ion Conductive Separator 14

The following description will describe the preparation of an LDH separator as an example of the hydroxide ion conductive separator 14.

Next, an LDH powder expressed by the general formula of $M^{2+}_{1-x}M^{3+}_{x}(OH)_2A^{n-}_{x/n}\cdot mH_2O$ is prepared.

Next, an LDH green body having a relative density of 43 to 65% is prepared by pressure molding (for example CIP or the like) of an LDH powder. The relative density of the LDH green body is a value that is calculated by dividing the density calculated on the basis of the weight and the dimensions of the LDH green body by a theoretical density. To suppress an effect of adsorbed moisture on the relative density, the LDH green body is preferably prepared by use of LDH powder that is stored for at least 24 hours in a desiccator at less than or equal to a relative humidity of 20%.

Next, an LDH fired body is prepared by firing the LDH green body (400 to 850 degrees C., 1 to 10 hours). The weight of the LDH fired body is preferably 57 to 65% of the LDH green body, and the volume of the LDH fired body is preferably less than or equal to 70 to 76% of the LDH green body.

Next, the LDH fired body is retained in or directly above an aqueous solution that includes negative ions ($A^{n-}$) of n valency to produce an LDH body by hydrothermal synthesis (20 to 200 degrees C., 1 to 50 hours).

Then, excess moisture is removed from the LDH body in an environment of a temperature of less than or equal to 300 degrees C. and less than or equal to 25% humidity to thereby complete an LDH separator.

3. Assembly of Battery Housing 20

Then, the negative electrode gasket 28 is mounted on the negative electrode housing 24 that contains the negative electrode 16 that is immersed in the electrolyte solution.

Next, the hydroxide ion conductive separator 14, the layered body of the air electrode 12 and the positive electrode current collecting body 18, and the air electrode gasket 26 are disposed in sequence on the negative electrode gasket 28, and then the air electrode housing 22 on which the air electrode gasket 26 is mounted is covered.

The zinc-air secondary battery 10 is completed in the above manner.

Other Embodiments

Although an embodiment of the present invention has been described, the present invention is not limited to the above embodiment, and various modifications are possible within a scope that does not depart from the spirit of the invention.

Although a zinc-air secondary battery 10 has been described as an example of a Metal-air battery, the air electrode 12 of the present invention may also be used in related to other metal-air batteries such as lithium-air secondary batteries or the like.

The zinc air secondary battery 10 is configured to include the air electrode 12, the hydroxide ion conductive separator 14, the negative electrode 16 that is immersed in an electrolyte solution, the positive electrode current collecting body 18, and the housing 20. However, a configuration of at least the air electrode 12, and the negative electrode 16 is sufficient.

There is no particular limitation in relation to the shape of the zinc-air secondary battery 10, and for example, it may be configured in a coin shape, button shape, sheet shape, layered shape, cylindrical shape, flat shape, square shape, or the like.

The air electrode 12 may be adapted also in relation to a large secondary battery that is used in an electrical automobile or the like in relation to merely a small type of secondary battery.

The zinc-air secondary battery 10 may further comprise a positive electrode that is designated for charging. A designated charging positive electrode is disclosed in Japanese Patent Application Laid-Open No. 2010-176941. Provision of a designated charging positive electrode enables a high charging rate as a result of use of the designated charging positive electrode during charging operations even when the hydroxide ion conductivity of the hydroxide ion conductive separator 14 is low. Furthermore, since the production of oxygen at the air electrode 12 during charging operations is suppressed, it is possible to suppress deterioration or corrosion of the air electrode 12. The designated charging positive electrode includes carbon or metal titanium mesh configurations or the like.

EXAMPLES

The examples of a metal-air battery according to the present invention will be described below. However, the present invention is not thereby limited to the following examples.

Preparation of Examples 1 to 3

A metal-air battery according to Examples 1 to 3 is prepared as described below.

Firstly CNT as an inorganic binder is dispersed in water to prepare a CNT dispersion having a CNT concentration of 0.1 wt %.

Then, the CNT dispersion is heated to vaporize the solvent, and configure a viscosity of the CNT dispersion of 25 Pa·s.

Next, a commercial available $Mg_{0.75}$—$Al_{0.25}$ LDH powder (Tradename: DHT6 manufactured by Kyowa Chemical Industry Co., Ltd) is prepared.

Then, the concentrated CNT dispersion and the LDH powder are weighed so that the blending ratio of CNT and LDH coincides with the values illustrated in Table 1.

Next, after placing the weighed CNT dispersion and the LDH powder into an agate mortar, the agate mortar is heated using a hot stirrer to thereby blend the CNT dispersion and the LDH powder and prepare a blended paste (air electrode material). During this process, visual confirmation is performed that the CNT in the blended paste is uniformly blended. Although not shown in Table 1, the mixture prepared by blending CNT powder (product name: EC-P manufactured by manufactured by Meijo Carbon (Ltd.)) did not result in a uniform blending since the CNT underwent aggregation. In the same manner, although not shown in Table 1, the mixture prepared by using finely cut CNT sheets (product name: EC-P paper manufactured by manufactured by Meijo Carbon (Ltd.)) did not result in a uniform blending due to difficulties in sufficiently cutting the sheets in a uniformly fine manner.

Then, after printing the blended paste onto carbon paper, drying is performed at 80 degrees C. in an atmosphere of air. A layered body of the air electrode and the positive electrode current collecting body is completed in accordance with the above description.

Next, an ion example membrane (product name: Neosepta AHA manufactured by Astom Corporation) is prepared as a separator.

Then, the negative electrode gasket is mounted onto the negative electrode housing that contains a polypropylene nom-woven fabric immersed in a 1M KOH aqueous solution, and the separator, the layered body formed from the air electrode and the positive electrode current collecting body, and the air electrode gasket are disposed in sequence on the negative electrode gasket. Then the air electrode housing on which the air electrode gasket is mounted is covered.

Preparation of Example 4

A metal-air battery according to Example 4 is prepared as described below.

Firstly CNT as an inorganic binder is dispersed in water to prepare a CNT dispersion having a CNT concentration of 0.1 wt %.

Then, the CNT dispersion is heated to vaporize the solvent, and configure a viscosity of the CNT dispersion of 25 Pa·s.

Then, a commercial available $Mg_{0.75}$—$Al_{0.25}$ LDH powder (Tradename: DHT6 manufactured by Kyowa Chemical Industry Co., Ltd) is prepared.

Then, a lanthanum hydroxide powder, a nickel oxide powder, a copper oxide powder and an iron oxide powder are dried (110 degrees C., 12 hours) and weighed so that x=0.2 and y=0.05 in the composition formula $LaNi_{1-x-y}Cu_xFe_yO_{3-\delta}$. Then, after wet blending the weighed powders in an aqueous medium and drying, a blended powder is prepared by passing through a sieve. Next, a calcined powder is prepared by placing the blended powder in a covered alumina crucible and calcining in an oxygen atmosphere (1100 degrees C., 12 hours). Next, after pulverizing the calcined powder and preparing a green body by applying uniaxial pressing, a sintered body is prepared by disposing the green body in an alumina sheath and firing in an oxygen atmosphere (1100 degrees C., 12 hours). Then the sintered body is subjected to wet grinding using a ball mill to prepare an LNFCu powder as an example of a perovskite oxide.

Next, the concentrated CNT dispersion, the LDH powder and the LNFCu powder are weighed so that the blending ratio of CNT, LDH and LNFCu coincides with the values illustrated in Table 1.

Next, after placing the weighed CNT dispersion, the LDH powder and the LNFCu powder into an agate mortar, the agate mortar is heated using a hot stirrer to thereby blend the CNT dispersion, the LDH powder and the LNFCu powder and prepare a blended paste (air electrode material). During this process, visual confirmation is performed that the CNT in the blended paste is uniformly blended.

Then, after printing the blended paste onto carbon paper, drying is performed at 80 degrees C. in an atmosphere of air. A layered body of the air electrode and the positive electrode current collecting body is completed in accordance with the above description.

Next, an ion example membrane (product name: Neosepta AHA manufactured by Astom Corporation) is prepared as a separator.

Then, the negative electrode gasket is mounted onto the negative electrode housing that contains a polypropylene non-woven fabric immersed in a 1M KOH aqueous solution, and the separator, the layered body formed from the air electrode and the positive electrode current collecting body, and the air electrode gasket are disposed in sequence on the negative electrode gasket. Then the air electrode housing on which the air electrode gasket is mounted is covered.

Preparation of Example 5

A metal-air battery according to Example 5 is prepared as described below.

Firstly a concentrated CNT dispersion is prepared in the same manner as Examples 1 to 3.

Next, an LDH powder is prepared in the same manner as Examples 1 to 3.

A dispersion is prepared using polytetrafluoroethylene as an organic binder (PTFE) (PTFE concentration 60 wt. %) (Product Name: EC-TFE-500ML manufactured by Electro-Chem Inc.).

Next, the concentrated CNT dispersion, the LDH powder and the PTFE dispersion are weighed so that the blending ratio of CNT, PTFE and LDH coincides with the values illustrated in Table 1.

Next, after placing the weighed CNT dispersion, the PTFE dispersion and the LDH powder into an agate mortar, the agate mortar is heated using a hot stirrer to thereby blend the CNT dispersion, PTFE dispersion and the LDH powder and prepare a blended paste (air electrode material).

Then, after printing the blended paste onto carbon paper, drying is performed at 80 degrees C. in an atmosphere of air. A layered body formed from the air electrode and the positive electrode current collecting body is completed in accordance with the above description.

Next, an ion example membrane (product name: Neosepta AHA manufactured by Aston) Corporation) is prepared as a separator.

Then, the negative electrode gasket is mounted onto the negative electrode housing that contains a polypropylene non-woven fabric immersed in a 1M KOH aqueous solution, and the separator, the layered body formed from the air electrode and the positive electrode current collecting body, and the air electrode gasket are disposed in sequence on the negative electrode gasket. Then the air electrode housing on which the air electrode gasket is mounted is covered.

Preparation of Comparative Example 1

A metal-air battery according to Comparative Example 1 is prepared as described below.

Firstly carbon black (product name: Denka Black (Powder) manufactured by Denka Company Limited) is prepared.

Next, an LDH powder is prepared in the same manner as Examples 1 to 3.

Then, a dispersion using PTFE as an organic binder is prepared.

Next, the carbon black, the LDH powder and the PTFE powder are weighed so that the blending ratio of carbon black, PTFE and LDH coincides with the values illustrated in Table 1.

Next, after placing the weighed carbon black, the PTFE dispersion and the LDH powder into an agate mortar, the agate mortar is heated using a hot stirrer to thereby blend the carbon black, PTFE dispersion and the LDH powder and prepare a blended paste (air electrode material).

Then, after printing the blended paste onto carbon paper, drying is performed at 80 degrees C. in an atmosphere of air. A layered body of the air electrode and the positive electrode current collecting body is completed in accordance with the above description.

Next, an ion example membrane (product name: Neosepta AHA manufactured by Astom Corporation) is prepared as a separator.

Then, the negative electrode gasket is mounted onto the negative electrode housing that contains a polypropylene non-woven fabric immersed in a 1M KOH aqueous solution, and the separator, the layered body formed from the air electrode and the positive electrode current collecting body, and the air electrode gasket are disposed in sequence on the negative electrode gasket. Then the air electrode housing on which the air electrode gasket is mounted is covered.

SEM Observation

Figure 5:
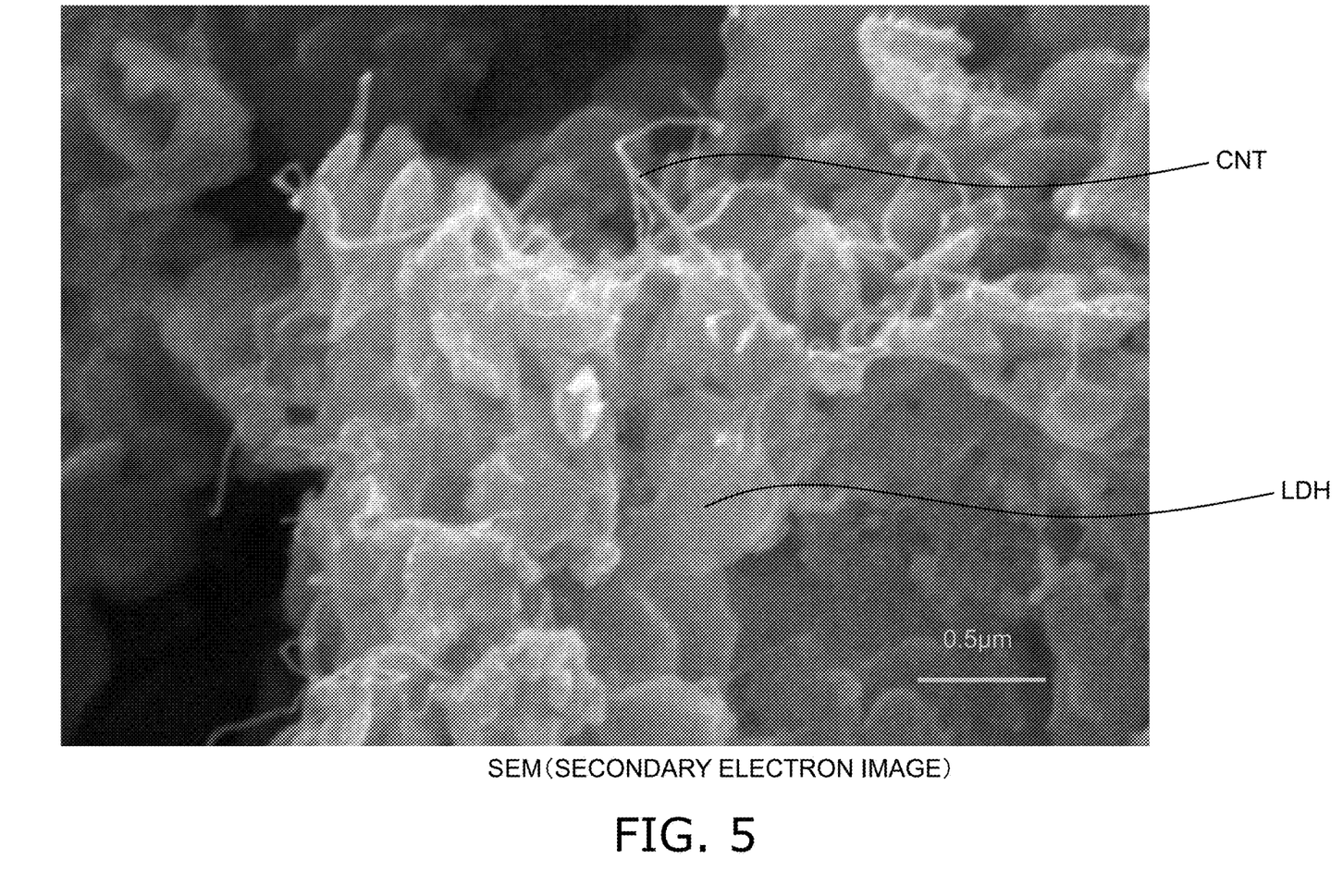
FIG. 5 is a SEM secondary electron image of an air electrode cross section.
Figure 6:
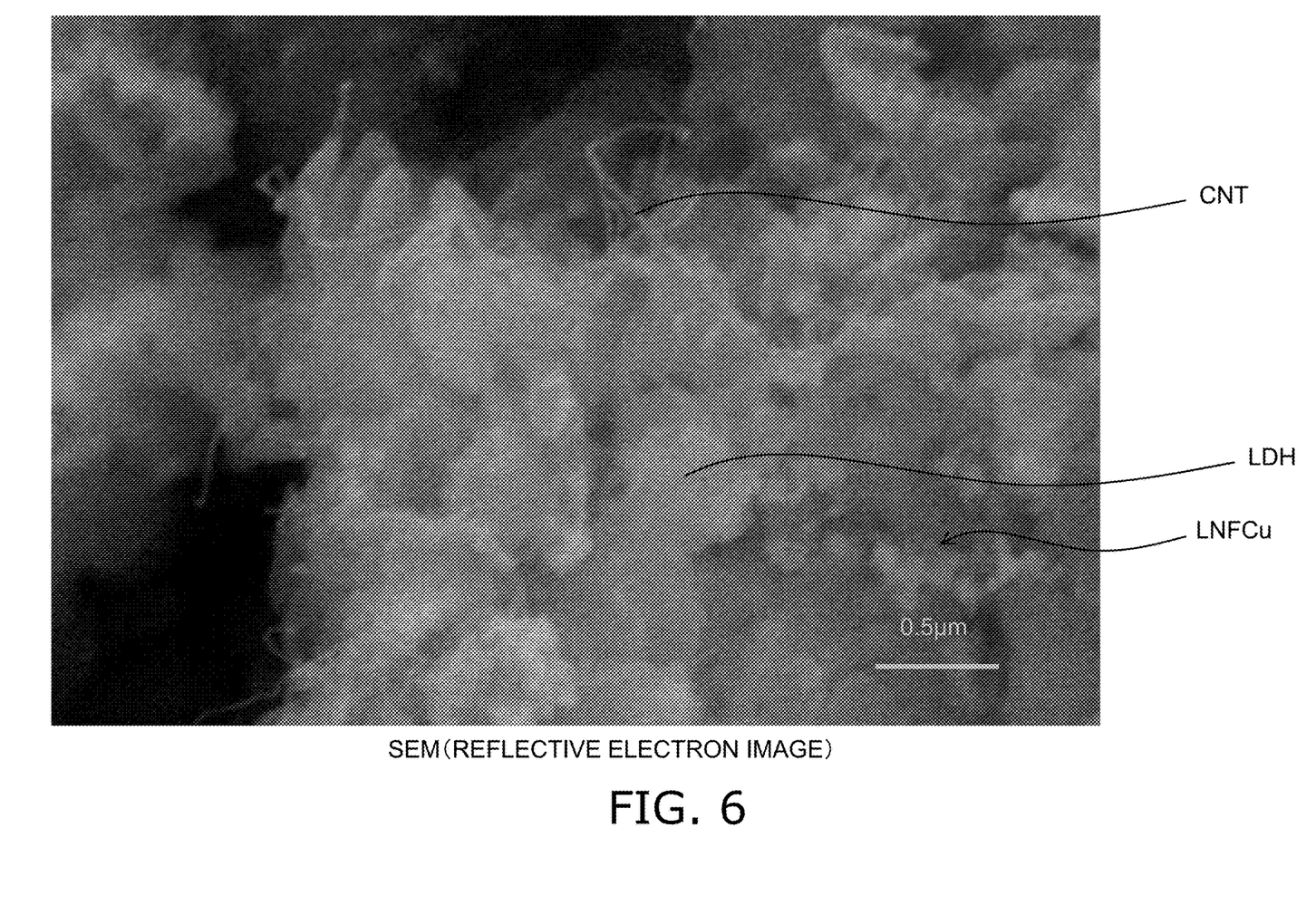
FIG. 6 is a SEM reflective electron image of an air electrode cross section.

A cross section of the air electrode according to Examples 1 to 5 is observed using an SEM to thereby observe the microstructure of the air electrode. FIG. 5 is a SEM secondary electron image of an air electrode cross section of Example 4. FIG. 6 is a SEM reflective electron image of an air electrode cross section of Example 4. The SEM is a JSM-6610LV manufactured by JEOL Ltd., and has an acceleration voltage of 20 kV.

As illustrated in FIG. 5, it is possible to observe a configuration in which the plurality of CNT generally encloses the plurality of LDH to thereby function as a binder. The plurality of CNT 12a is in mutual contact to thereby form a long distance electron conducting path. The plurality of CNT is entangled as a result of entangling into the plurality of LDH. The plurality of LDH is respectively in a plate configuration. A portion of the surface of the LDH particles is exposed.

As illustrated in FIG. 6, the average particle diameter of the plurality of LNFCu particles is preferably smaller than the average particle diameter of the LDH particles. The LNFCu particles are supported on the LDH. Since the LNFCu particles are in mutual contact, a short distance electron conducting path is formed. The direct mutual contact of the LNFCu particles and CNT enables the connection of the long distance electron conducting path of CNT with the short distance electron conducting path of the plurality of the LNFCu particles.

Evaluation of Over-Voltage of Air Electrode

Figure 4:
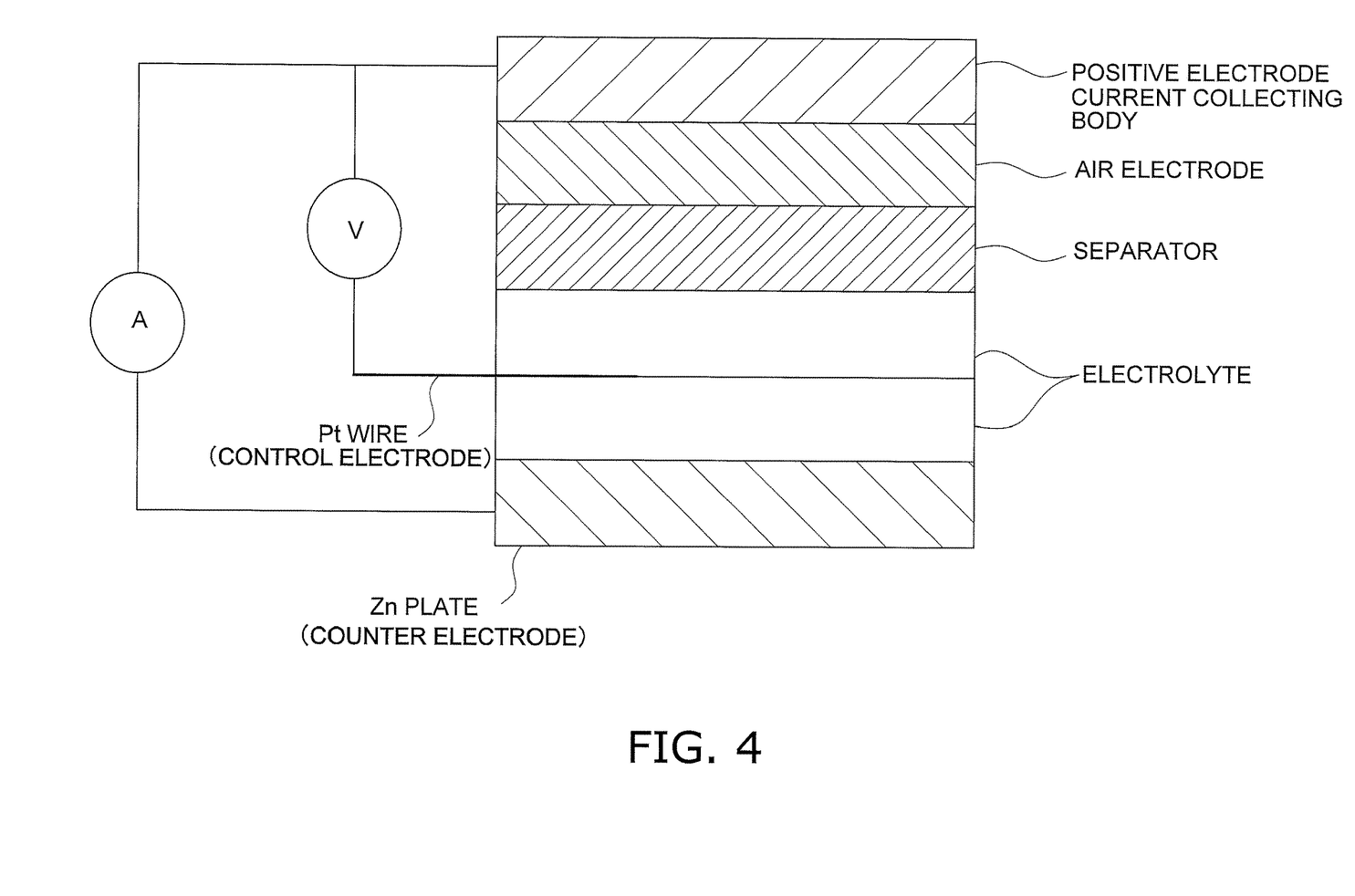
FIG. 4 is a schematic view illustrating a method of measuring an air electrode resistance.

FIG. 4 is a schematic view illustrating a method of measuring an over-voltage of the air electrode.

Firstly, a control electrode of Pt wire is inserted into an electrolyte solution, a Zn plate as a counter electrode opposite the air electrode is disposed to sandwich the electrolyte solution and configure the working electrode as the air electrode.

Then, a current having a current density of 100 mA/cm$^2$ is caused to flow from an open circuit configuration, and the charging voltage of the counter electrode relative to the reference electrode after 10 minutes is recorded.

The open circuit voltage of the counter electrode relative to the reference electrode after 10 minutes is measured after returning to an open circuit state.

The difference between the respective charging voltages and the open circuit voltage are calculated as the over-voltage (V). The calculation results are shown in Table 1. In Table 1, an over-voltage of less than 1.0(V) is denoted as A (superior), an over-voltage of less than 1.5(V) is denoted as B (good), an over-voltage of greater than or equal to 1.5 (V) and less than 2.0(V) is denoted as C (acceptable), and an over-voltage of greater than or equal to 2.0(V) is denoted as D (unacceptable).

TABLE 1

| Sample No. | Electron Conductive Material (volume %) | Hydroxide Ion Conductive Material (volume %) | Organic Binder (volume %) | Evaluation of Overvoltage of Cathode | |
|---|---|---|---|---|---|
| Example 1 | CNT (40 volume %) | Mg0.75Al0.25 - LDH (60 volume %) | none | C | C |
| Example 2 | CNT (5 volume %) | Mg0.75Al0.25 - LDH (95 volume %) | none | B | B |
| Example 3 | CNT (0.1 volume %) | Mg0.75Al0.25 - LDH (99.9 volume %) | none | C | C |
| Example 4 | CNT (5 volume %) + LNFCu (1 volume %) | Mg0.75Al0.25 - LDH (94 volume %) | none | A | A |
| Example 5 | CNT (5 volume %) | Mg0.75Al0.25 - LDH (93 volume %) | PTFE (2 volume %) | C | C |
| Comparative Example 1 | Carbon Black (80 volume %) | Mg0.75Al0.25 - LDH (10 volume %) | PTFE (10 volume %) | D | D |

As shown in Table 1, in Examples 1 to 5, it is possible to reduce the over-voltage during charging in comparison to Comparative Example 1. This is due to the enhancement in the characteristics of the air electrode (hydroxide ion conductivity, electron conductivity and catalyst reactivity) as a result of use of CNT that is an inorganic binder in substitution for an organic binder.

As illustrated in Table 1, in Examples 2 and 4, it is possible to reduce the over-voltage during charging in comparison to Comparative Examples 1 and 3. This result demonstrates that the content amount of CNT in the air electrode is preferably less than or equal to 5 vol %.

As illustrated in Table 1, in Example 4, it is possible to reduce the over-voltage during charging in comparison to Comparative Example 2. This result demonstrates that the effectiveness of introducing a perovskite oxide (LNFCu) as a perovskite oxide.

The invention claimed is:

1. An air electrode used in a metal-air battery, the air electrode comprising;
   a plurality of carbon nanotubes,
   a plurality of layered double hydroxide particles, and
   a plurality of perovskite oxide particles, wherein the plurality of layered double hydroxide particles are supported on the plurality of carbon nanotubes, and
   wherein an average particle diameter of the plurality of perovskite oxide particles is less than an average particle diameter of the plurality of layered double hydroxide particles, and the plurality of perovskite oxide particles are directly supported on the plurality of layered double hydroxide particles.

2. The air electrode according to claim 1, wherein at least a portion of the plurality of carbon nanotubes are in mutual contact.

3. The air electrode according to claim 1, wherein the plurality of carbon nanotubes are entangled with the plurality of layered double hydroxide particles.

4. The air electrode according to claim 1, wherein an average length of the plurality of carbon nanotubes is greater than or equal to 0.1 µm.

5. The air electrode according to claim 1, wherein at least a portion of the plurality of layered double hydroxide particles are in mutual contact.

6. The air electrode according to claim 1, wherein the respective plurality of layered double hydroxide particles are tabular in shape.

7. The air electrode according to claim 1, wherein an average particle diameter of the plurality of layered double hydroxide particles is less than or equal to 10 µm.

8. The air electrode according to claim 1, wherein at least a portion of the plurality of perovskite oxide particles are in mutual contact.

9. The air electrode according to claim 1, wherein at least a portion of the plurality of perovskite oxide particles are in contact with the plurality of carbon nanotubes.

10. The air electrode according to claim 1, wherein a portion of a surface of the respective plurality of layered double hydroxide particles is exposed from the plurality of perovskite oxide particles.

11. A metal-air battery comprising;
    the air electrode according to claim 1,
    a negative electrode, and
    an electrolyte disposed between the air electrode and the negative electrode.

12. The metal-air battery according to claim 11, wherein, the electrolyte is an inorganic solid electrolyte that exhibits hydroxide ion conductivity.

13. An air electrode material used in a metal-air battery, the air electrode material comprising;
    a plurality of carbon nanotubes,
    a plurality of layered double hydroxide particles, and
    a plurality of perovskite oxide particles,
    wherein the plurality of layered double hydroxide particles are in contact with the plurality of carbon nanotubes, and
    wherein an average particle diameter of the plurality of perovskite oxide particles is less than an average particle diameter of the plurality of layered double hydroxide particles, and the plurality of perovskite oxide particles are directly supported on the plurality of layered double hydroxide particles.

* * * * *